US010467222B1

(12) United States Patent
Kuang et al.

(10) Patent No.: US 10,467,222 B1
(45) Date of Patent: Nov. 5, 2019

(54) RECOVERING COMPRESSED DATA TO REDUCE DATA LOSS

(71) Applicant: EMC IP Holding Company LLC, Hopkinton, MA (US)

(72) Inventors: Yaming Kuang, Shanghai (CN); Weili Huang, Shanghai (CN); Hansi Wu, Shanghai (CN); Marc DeSouter, Wayne, NJ (US); Ivan Bassov, Brookline, MA (US); Frankie Wei Fang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 229 days.

(21) Appl. No.: 15/395,968

(22) Filed: Dec. 30, 2016

(51) Int. Cl.
*G06F 16/23* (2019.01)
*G06F 16/16* (2019.01)
*G06F 16/174* (2019.01)
*G06F 16/2455* (2019.01)

(52) U.S. Cl.
CPC .......... *G06F 16/2365* (2019.01); *G06F 16/16* (2019.01); *G06F 16/1744* (2019.01); *G06F 16/24562* (2019.01)

(58) Field of Classification Search
CPC .............. G06F 17/30371; G06F 17/30115
See application file for complete search history.

(56) References Cited

U.S. PATENT DOCUMENTS

| 5,701,516 | A | 12/1997 | Cheng et al. |
| 8,190,850 | B1 | 5/2012 | Davenport et al. |
| 8,825,591 | B1* | 9/2014 | Lai .................... G06F 17/30073 707/602 |
| 9,916,191 | B1 | 3/2018 | Pan et al. |
| 2011/0167049 | A1* | 7/2011 | Ron .................... G06F 11/1435 707/690 |
| 2014/0331011 | A1* | 11/2014 | Kesavan ............... G06F 3/0689 711/133 |
| 2016/0004715 | A1* | 1/2016 | Amit .................... G06F 3/0608 707/693 |
| 2016/0371297 | A1* | 12/2016 | Okun ................. G06F 17/30221 |
| 2017/0177603 | A1* | 6/2017 | Constantinescu ........................... G06F 17/30153 |

OTHER PUBLICATIONS

Yannis Klonatos et al., "Transparent Online Storage Compression at the Block-Level", ACM Transactions on Storage, May 2012, 33 pages, vol. 8, No. 2, Article 5.

* cited by examiner

*Primary Examiner* — Hosain T Alam
*Assistant Examiner* — Anthony G Gemignani
(74) *Attorney, Agent, or Firm* — BainwoodHuang (57) ABSTRACT

A technique for repairing damage to a file system stores compression headers in association with respective extents of in-line compressed data. A repair utility reads contents from the compression headers and applies the contents to repair damaged metadata structures that the file system uses to access the associated extents. In this fashion, the repair utility restores access to compressed data, which would otherwise be lost.

13 Claims, 7 Drawing Sheets

RECOVERING COMPRESSED DATA TO REDUCE DATA LOSS

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems employ data compression to improve storage efficiency. For example, a software program running on a data storage system may read data from disk, compress the data, and write the compressed data back to disk. To read data that has been compressed, the program may work in the opposite direction, e.g., by fetching compressed data from disk, decompressing the data, and presenting the decompressed data to a requesting program.

SUMMARY

Data storage systems that employ compression generally do so in the background, such as by running a background process or daemon that acts upon already-stored data. Performing compression in the background may result in an over-commitment of storage resources, however, as more storage space than necessary may be required to accommodate initial writes. Also, background compression may entail reading previously-written data from persistent storage and rewriting compressed data back to persistent storage, resulting in a significant increase in disk traffic.

Recent improvements in data storage systems perform data compression in line with storage requests, such that incoming data are compressed prior to the first time they are stored on disk. This arrangement helps to avoid over-commitment of storage resources and to avoid increases in disk traffic.

Unfortunately, file system metadata that supports in-line compression can become damaged. For example, hardware faults, software errors, and the like can cause corruption in critical metadata structures that file systems depend upon to locate and access compressed data. When such structures become damaged, compressed data may become inaccessible, and hundreds of kilobytes of data may be lost as a result of a single metadata error.

File systems commonly employ repair utilities, such as FSCK (File System Check), Chkdsk (Check Disk), Ntfsfix (New Technology File System Fix), and the like. Such repair utilities can address common file system errors, but they do not address certain errors specific to in-line compressed data.

In contrast with previous approaches, an improved technique for repairing damage to a file system includes storing compression headers in association with respective extents of in-line compressed data. A repair utility reads contents from the compression headers and applies the contents to repair damaged metadata structures that the file system uses to access the associated extents. In this fashion, the repair utility restores access to compressed data, which would otherwise be lost.

Certain embodiments are directed to a method of repairing damage to a file system. The method includes accessing a segment in the file system, the segment including multiple compressed extents, each compressed extent storing compressed data of a respective portion of a file in the file system and having an associated compression header. The file system provides a respective metadata path from an inode of the file to each of the compressed extents. The method further includes accessing, from the segment, a first compression header associated with a first compressed extent, to obtain a data element stored in the first compression header, and correcting damage in a metadata path from the inode to the first compressed extent by applying the data element obtained from the first compression header.

Other embodiments are directed to a data storage system constructed and arranged to perform a method of repairing damage to a file system, such as the method described above. Still other embodiments are directed to a computer program product. The computer program product stores instructions which, when executed on control circuitry of a data storage system, cause the data storage system to perform a method of repairing damage to a file system, such as the method described above.

The foregoing summary is presented for illustrative purposes to assist the reader in readily grasping example features presented herein; however, the foregoing summary is not intended to set forth required elements or to limit embodiments hereof in any way. One should appreciate that the features described above can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for repairing damage to a file system stores compression headers in association with respective extents of in-line compressed data. A repair utility reads contents from the compression headers and applies the contents to repair damaged metadata structures that the file system uses to access the associated extents. In this fashion, the repair utility restores access to compressed data, which would otherwise be lost.

Figure 1:
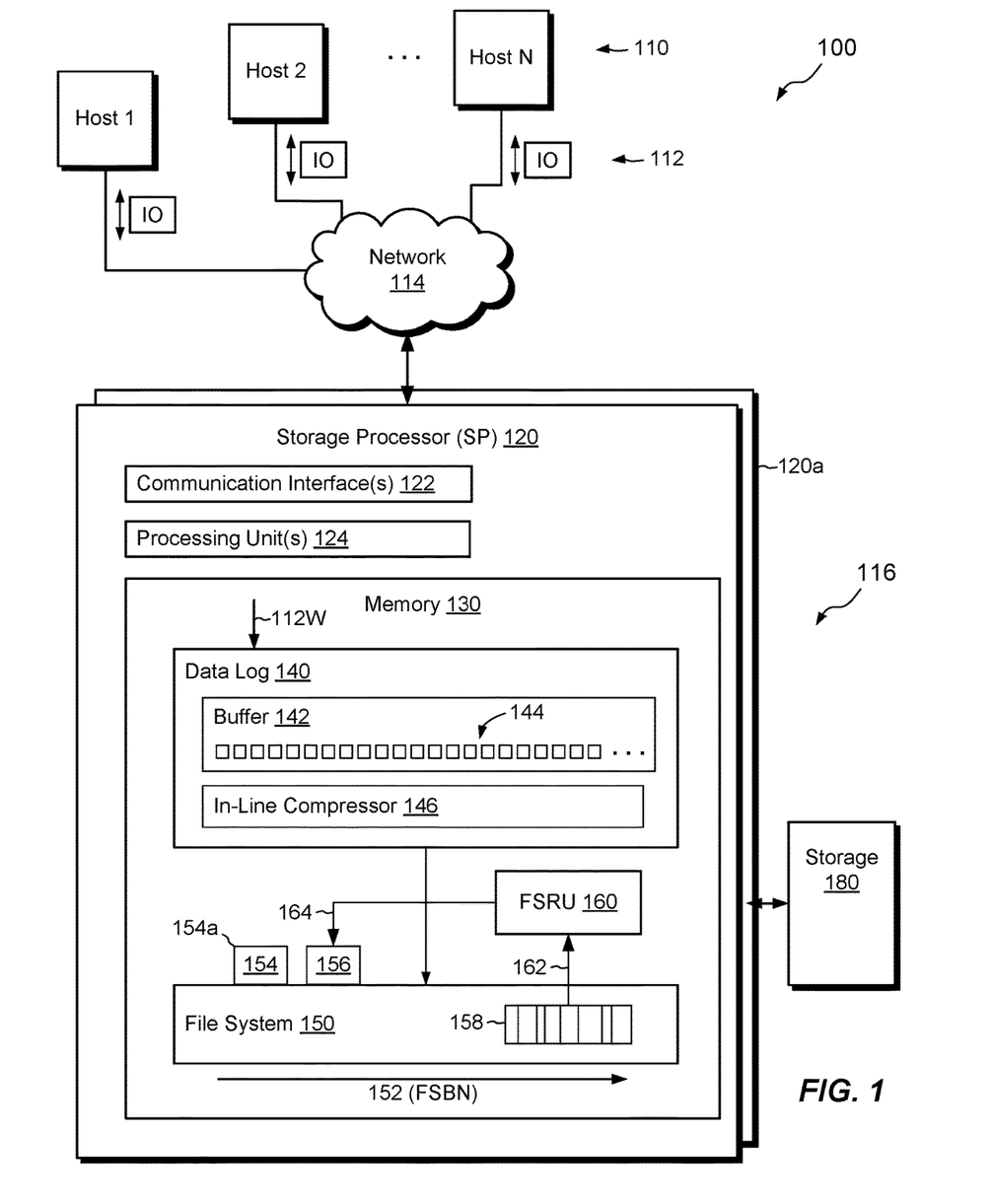
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. The data storage system 116 includes a storage processor, or "SP," 120 and storage 180. In an example, the storage 180 includes multiple disk drives, such as magnetic disk drives, electronic flash drives, optical drives, and/or other types of drives.

The data storage system 116 may include multiple SPs like the SP 120 (e.g., a second SP 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs may be provided, including a single SP, and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The hosts 110 may connect to the SP 120 using various technologies, such as Fibre Channel, iSCSI, NFS, and CIFS, for example. Any number of hosts 110 may be provided, using any of the above protocols, some subset thereof, or other protocols besides those shown. As is known, Fibre Channel and iSCSI are block-based protocols, whereas NFS and CIFS are file-based protocols. The SP 120 is configured to receive IO requests 112 according to block-based and/or file-based protocols and to respond to such IO requests 112 by reading or writing the storage 180.

The SP 120 includes one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by operation of software instructions, a data log 140, a file system 150, and a file system repair utility (FSRU) 160, such as FSCK, Chkdsk, Ntfsfix, or the like. The data log 140 includes a buffer 142 and an in-line compressor 146. The file system 150 has a physical address space 152, which ranges, for example, from zero to some large number. The physical address space 152 is denominated in blocks, with each block address identified by File System Block Number, or "FSBN." A "block" is the smallest unit of storage space that the file system 150 can allocate. Blocks in file system 150 are typically uniform in size, with typical block sizes being 4 KB or 8 KB, for example.

The file system 150 stores a segment 158, which may be composed of multiple contiguous blocks, i.e., having consecutive FSBNs. A typical size of segment 158 may be 8 blocks, which works out to 64 KB for an 8-KB block size; however, the number of blocks in segment 158 may vary. Segment 158 stores portions of compressed data for a file 154a, which is designated by inode (index node) 154. In an example, inode 154 is a data structure, stored in one or more blocks of file system 150, which includes information about the file 154a, such as it size and ownership. Inode 154 also stores pointers to data of the file 154a. For example, inode 154 stores direct pointers to data blocks and/or indirect blocks (IBs), which themselves store arrays of pointers to the file's data. IBs may be arranged in multiple layers, forming an IB tree. IBs that point directly to data blocks of a file are called "leaf Ms." File system 150 may include additional metadata structures, which together with the IBs form metadata paths to compressed data in segment 158. Block 156 is shown to represent these metadata paths, which may include any number of IBs and other metadata structures for pointing to compressed data in segment 158.

One should appreciate that the file system 150 may include any number of files, each having a respective inode, and any number of segments for each file. A single file 154a and a single segment 158 are shown for simplicity. Also, file system 150 may employ various block-sharing arrangements, such as to support snapshots (point-in-time versions) and/or de-duplication. Although segment 158 may be described herein as belonging to a file 154a, one should appreciate that segment 158, or particular extents within segment 158, may be shared among multiple files.

In example operation, hosts 110 issue IO requests 112 to the data storage system 116, directing the data storage system 116 to perform reads and writes of one or more data objects. SP 120 receives the IO requests 112 at communication interface(s) 122 and passes them to memory 130 for further processing. Some of the IO requests 112 specify data writes 112W to a data object realized in file 154a. Data log 140 receives data writes 112W and stores data specified therein in blocks 144 of buffer 142, acknowledging writes back to hosts 110 once the specified data are stored. In an example, blocks 144 are the same size as blocks of the file system 150. Buffer 142 may be implemented in battery-backed and mirrored DRAM (Dynamic Random Access Memory), such that data stored therein may be deemed persisted even though the underlying media are volatile.

In-line compressor 146 accesses blocks 144 from buffer 142, compresses data from respective blocks to form respective extents of compressed data, applies a compression header to each compressed extent, aggregates compressed extents with respective headers into segments, and flushes the segments to the file system 150, with segment 158 being an example of one such segment. The storage 180 backs the file system 150 and stores the segments in physical media (e.g., disk drives). When the file system 150 receives a flushed segment, the file system 150 updates and/or creates metadata structures for pointing to the extents of compressed data in that segment. Each flushed segment thus includes multiple extents of compressed data and associated compression headers. Each extent of compressed data is a compressed version of a respective block 144, and each compression header includes metadata describing the associated compressed extent, such as its compressed size, logical address (relative to file 154a), and CRC (cyclic redundancy check). Other metadata may be provided in some examples.

At any time during system operation, a program or an administrator of data storage system 116 may start FSRU 160. For example, the file system 150 may identify errors in response to performing read and/or write requests 112, and the administrator may run FSRU 160 in an attempt to repair any damage. In addition to other functions normally performed by file system repair tools, FSRU 160 performs operations to repair particular metadata structures associated with in-line compressed data. For example, FSRU 160 reads one or more compression headers from segment 158 (arrow 162) and applies contents from such headers to repair one or more damaged metadata paths 156 (arrow 164). Repair operations may include, for example, replacing metadata structures that have damaged pointers, repairing fields in metadata structures that specify improper lengths of compressed extents in segment 158, and/or repairing fields of metadata structures that specify improper logical addresses of compressed extents in segment 158.

Figure 2:
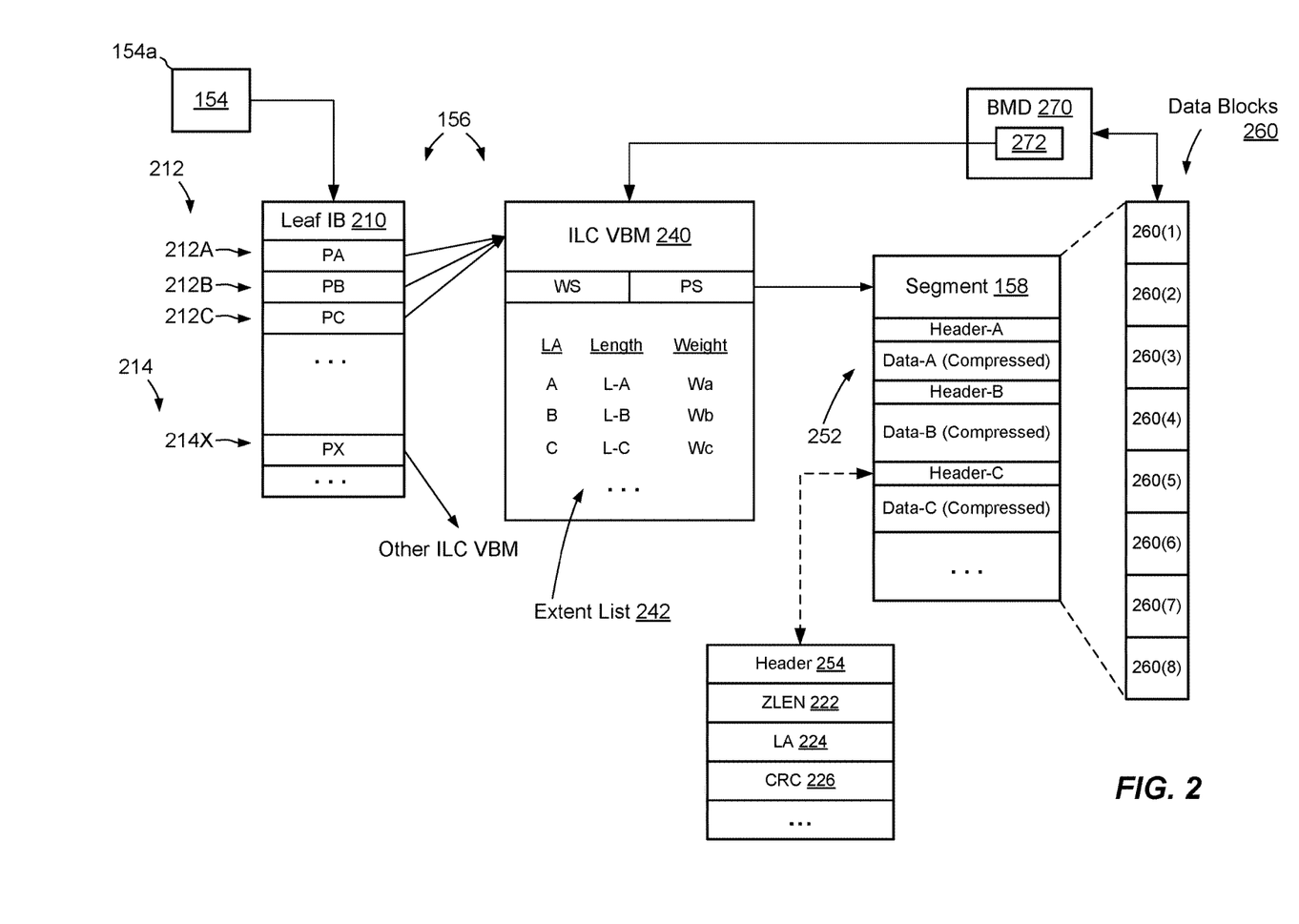
FIG. 2 is a block diagram showing an example metadata arrangement that supports storage of compressed data in a file system of FIG. 1.

FIG. 2 shows example metadata structures that support access to extents of compressed data in segment 158. Here, metadata paths 156 between inode 154 of file 154a and segment 158 include a leaf IB (Indirect Block) 210 and a metadata structure, such as ILC (in-line compression) VBM (virtual block map) 240. Leaf IB 210 includes block pointers 212, which map logical addresses of the file 154a to corresponding physical addresses (FSBNs) in the file system 150. For example, block pointer 212A maps logical address A, block pointer 212B maps logical address B, and block pointer 212C maps logical address C. Each logical address (A, B, or C) describes a block-sized increment of storage in file 154a, even though the underlying data may be compressed to much less than the size of a block.

Leaf IB 210 may include additional block pointers 212 (e.g., a total of 10, 16, 20, 21, etc.) that all point (via ILC VBM 240) to respective extents of compressed data in segment 158. Leaf IB 210 may also store additional block pointers, such as pointers 214 (e.g., 214X), which may point to other segments via other respective ILC VBMs. In some examples, leaf IB 210 also stores pointers (not shown) that point to uncompressed blocks. Leaf IB 210 may include any number of block pointers, a typical number being 1024, for example.

In the example shown, pointers 212 in leaf IB 210 all point to ILC VBM 240. ILC VBM 240 has a weight WS and a pointer PS. The weight WS indicates the number of block pointers (e.g., 212) that point to the ILC VBM 240, and the pointer PS points to the physical address (FSBN) of the segment 158, which by convention may be selected to be the address of the first data block in segment 158, i.e., 260(1). The ILC VBM 240 also has an extent list 242. Extent list 242 describes the contents of segment 158 and relates, for each extent of compressed data, the logical address (LA) of that item in the file (e.g., A, B, or C), a length (L-A, L-B, or L-C, e.g., in bytes) of that compressed data in the segment (158), and a weight (Wa, Wb, or Wc). In an example, the sum of weights of extents in the extent list 242 equals the total weight WS of the ILC VBM 240.

Segment 158 is composed of contiguous data blocks 260, i.e., blocks 260(1) through 260(8). For purposes of storing compressed data, boundaries between blocks 260(1) through 260(8) may be ignored and the segment 158 may be treated as one continuous space.

In an example, segment 158 has associated block metadata (BMD) 270. By convention, the BMD 270 may be per-block metadata provided for the first block in the segment 158, i.e., block 260(1). BMD 270 has a known location relative to block 260(1), and vice-versa, such that the location of each implies the location of the other in file system 150. BMD 270 may store a back-pointer 272 to the ILC VBM 240, i.e., to the particular ILC VBM that describes the compressed data stored in segment 158.

The detail shown in segment 158 indicates an example layout 252 of data items. For instance, Header-A can be found at Loc-A and immediately precedes compressed Data-A. Likewise, Header-B can be found at Loc-B and immediately precedes compressed Data-B. Similarly, Header-C can be found at Loc-C and immediately precedes compressed Data-C.

An example compression header 254 is shown for illustration, and is intended to be representative of all compression headers in segment 158 (or in any segment). In an example, each compression header is a fixed-size data structure. As shown, compression header 254 includes multiple data elements, such as the following:

ZLEN 222: the length of the corresponding extent of compressed data; e.g., in bytes.

LA 224: the logical address (e.g., A, B, C, and so on) of the corresponding extent of compressed data within the file 154a.

CRC 226: a cyclic redundancy check or other checksum of the corresponding extent of compressed data.

In various examples, compression header 254 may include additional information, such as the compression algorithm used to compress the corresponding data, whether the data is compressed using hardware or software, and various flags.

Figure 3:
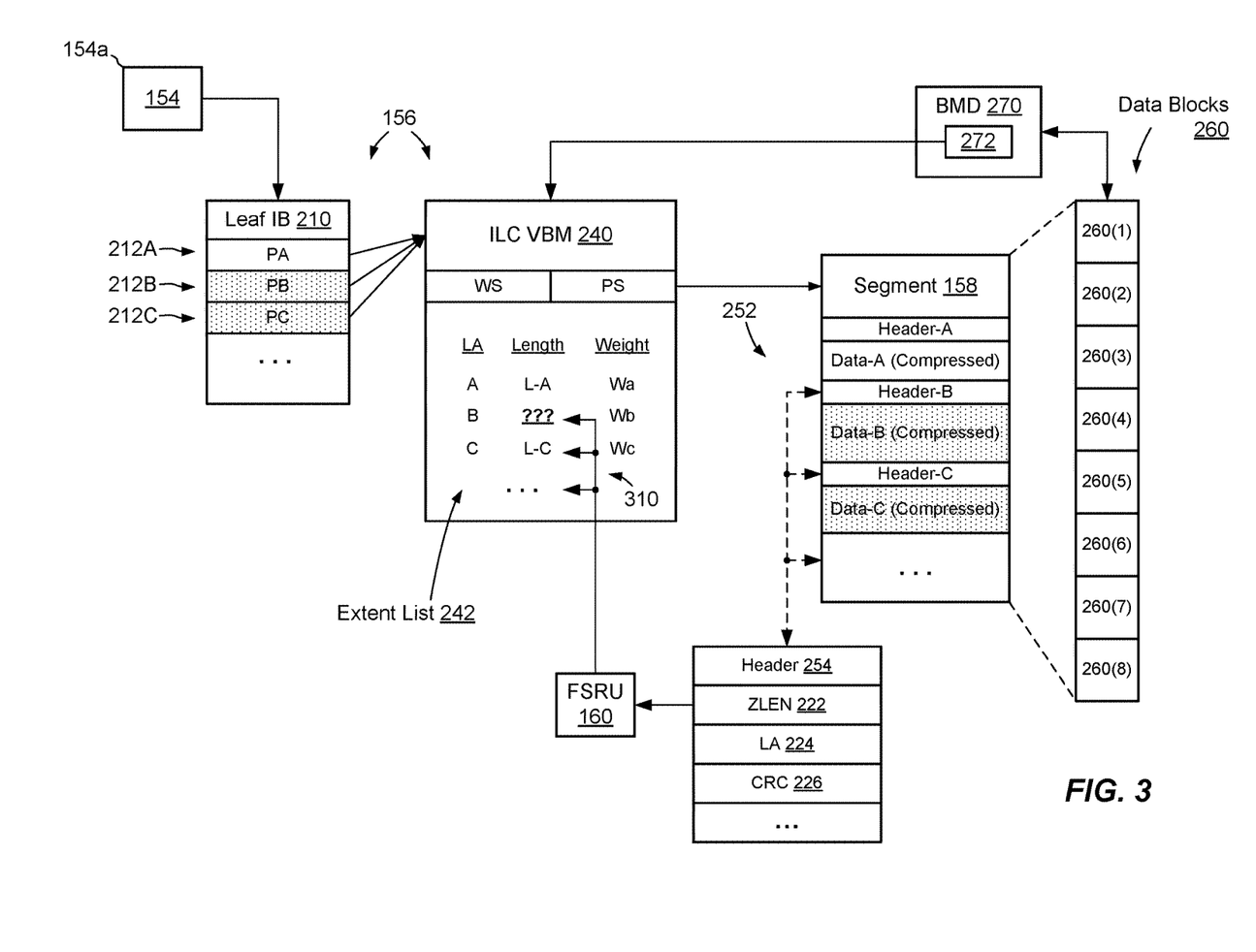
FIG. 3 is a block diagram showing the metadata arrangement of FIG. 2, where a stored extent length has been damaged but is then corrected using contents from a compression header.

FIG. 3 shows the same arrangement as in FIG. 2, but here an error has occurred such that the length of the second compressed extent as reported in extent list 242 (shown as "???") is incorrect. The error may be discovered, for example, when a failure occurs during a routine read or write operation. The error may also be discovered when running the FSRU 160 (FIG. 1). The error in the length of the second compressed extent may affect not only that one extent, but also all later extents in the extent list 242, as the error in length makes it difficult or impossible to identify where later extents begin and end in segment 158. As shown in the figure, suspect or invalid extents and corresponding pointers in leaf IB 210 are indicated using shading. With prior repair utilities, this error in extent length might be unrecoverable, and block locations 212B, 212C, and so on, might be identified as bad blocks.

Here, however, FSRU 160 reads the compression header 254 of the suspect extent and obtains the previously-stored length (ZLEN) 222. The FSRU 160 then compares the ZLEN 222 with the corresponding length of the same extent ("???") as reported in the extent list 242. If the two lengths differ, FSRU 260 acts to replace the erroneous length in the extent list 242 with the value of ZLEN 222. FSRU 260 may also replace length values in extent list 242 with corresponding ZLEN's 222 for all extents that follow the one with the damaged length, as all such lengths are suspect (see arrow 310). Indeed, FSRU 260 may check the entire extent list 242, replacing any length that differs from the corresponding ZLEN 222 in the respective header 254 with the corresponding ZLEN 222 from that header 254. In this fashion, the FSRU 160 fully restores access to compressed data in segment 158, which data might otherwise have been lost.

In some examples, the extent list 242 may report lengths of extents differently from the way the headers 254 provide these values in ZLEN's 222. In such examples, replacing a length value in the extent list 242 may involve converting, rounding, and/or truncating values of ZLEN 222 for proper representation in extent list 242.

Figure 4:
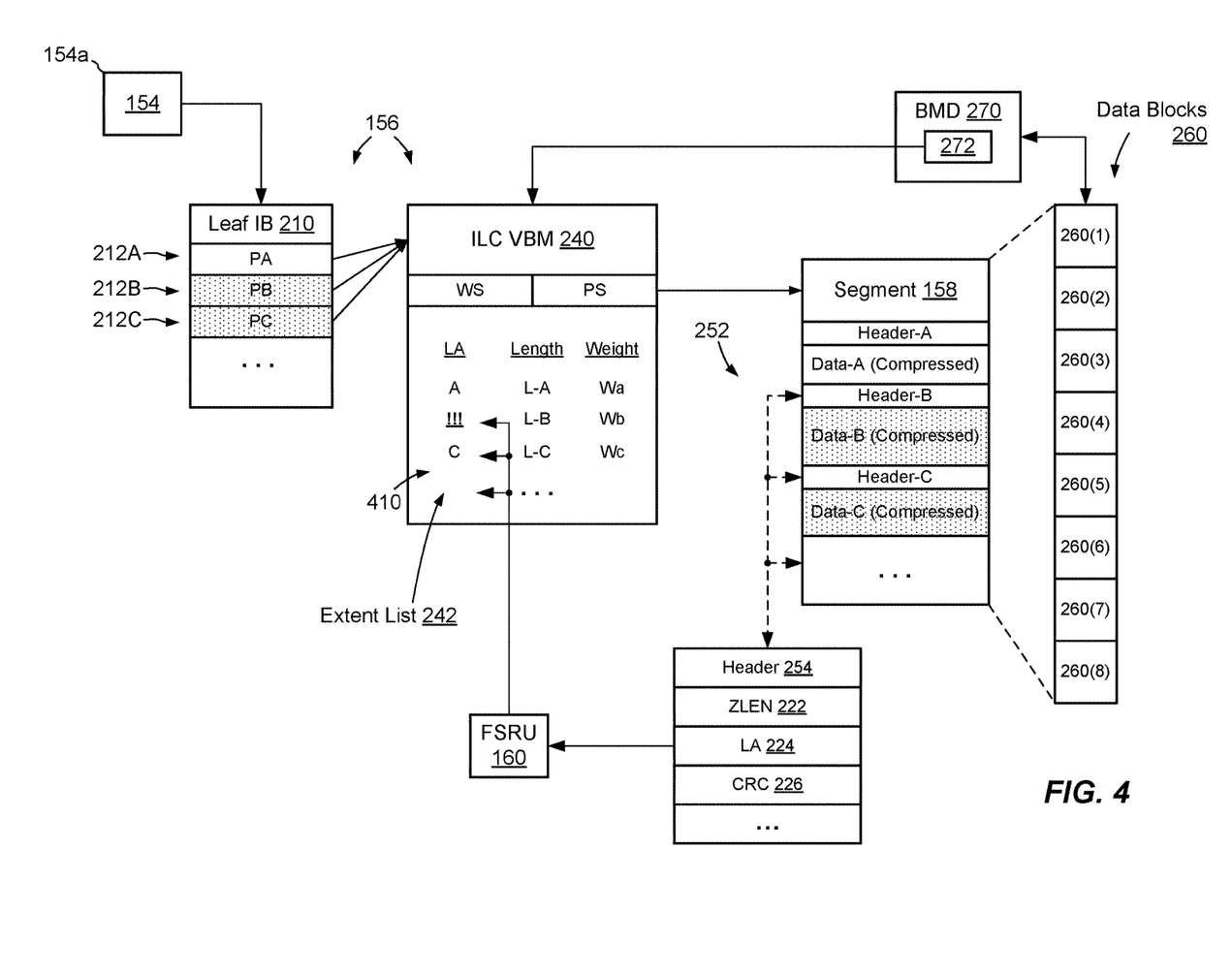
FIG. 4 is a block diagram showing the metadata arrangement of FIG. 2, where a stored logical address has been damaged but is then corrected using contents from a compression header.

FIG. 4 also shows the arrangement of FIG. 2, but here an error has occurred such that the logical address (LA) of the second compressed extent as reported in extent list 242 (shown as "!!!") is incorrect. As before, the error may be discovered when a failure occurs during a routine read or write operation. The error may also be discovered when running the FSRU 160 (FIG. 1). The error in the logical address of the second compressed extent may affect not only that one extent, but also all later extents in the extent list 242, as logical addresses of consecutive extents are often updated together. As shown in the figure, suspect or invalid extents and corresponding pointers in leaf IB 210 are indicated using shading. With prior repair utilities, this error in logical address might be unrecoverable, and block locations 212B, 212C, and so on, might be identified as bad blocks.

Here, however, FSRU 160 reads the compression header 254 of the suspect extent and obtains the previously-stored logical address (LA) 224. The FSRU 160 then compares the LA 224 with the corresponding logical address of the same extent ("!!!") as reported in the extent list 242. If the two LA's differ, FSRU 260 replaces the erroneous LA in the extent list 242 with the value of LA 224. FSRU 260 may also replace LA values in extent list 242 with corresponding LA's 224 for all extents that follow the one with the damaged LA, as all such LA's are suspect (see arrow 410). Indeed, FSRU 260 may check the entire extent list 242, replacing any LA that differs from the corresponding LA 224 in the respective header 254 with the corresponding LA 224 from that header 254. In this fashion, the FSRU 160 fully restores access to compressed data in segment 158, which data might otherwise have been lost.

In a particular arrangement, the error of a logical address in the extent list 242 may be discovered when two LA's in the extent list 242 are found to be identical. As this scenario generally occurs only as a result of an error, the discovery of this scenario may trigger the FSRU 160 to examine the extent list 242 and cross-check its logical address values against corresponding values 224 in the headers 254, with the first instance of a duplicate LA in the extent list providing a starting position for checking and replacing.

Figure 5:
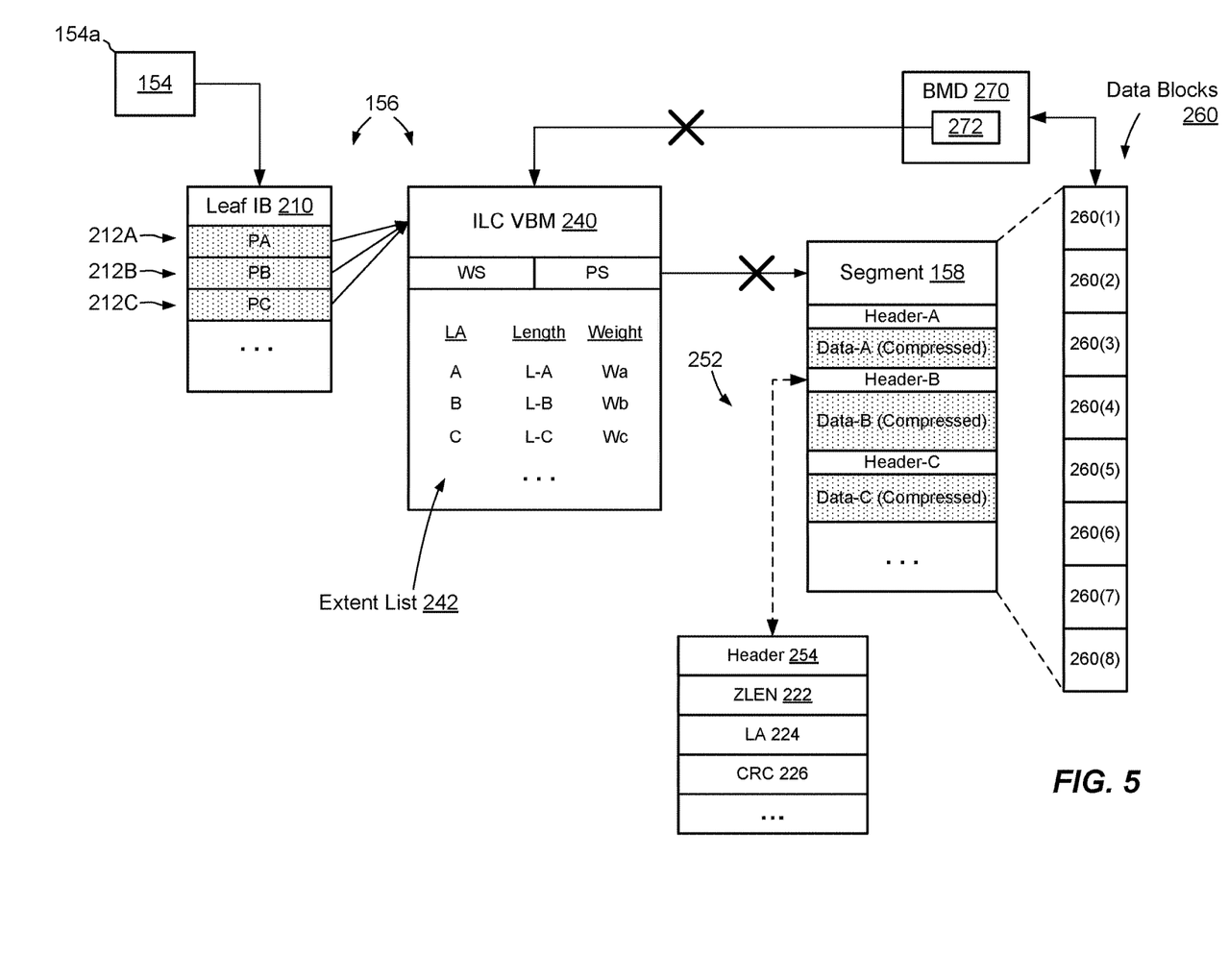
FIG. 5 is a block diagram showing the metadata arrangement of FIG. 2, where a metadata structure contains a broken pointer to a segment of compressed data.

FIG. 5 also shows the arrangement of FIG. 2, but here an error has occurred such that pointer PS in ILC VBM 240 does not point to the segment 158, as it normally would. Also, the back pointer 272 in BMD 270 does not point back to the ILC VBM 240, as it normally would. These errors can have far-reaching effects, as they may result in data loss of all data on the segment 158 (potentially hundreds of kilobytes), as such data can no longer be found through the usual metadata path (e.g., via leaf IB 210 and ILC VBM 240). Prior recovery tools might identify all blocks associated with pointers 212 as bad blocks (see shading).

Figure 6:
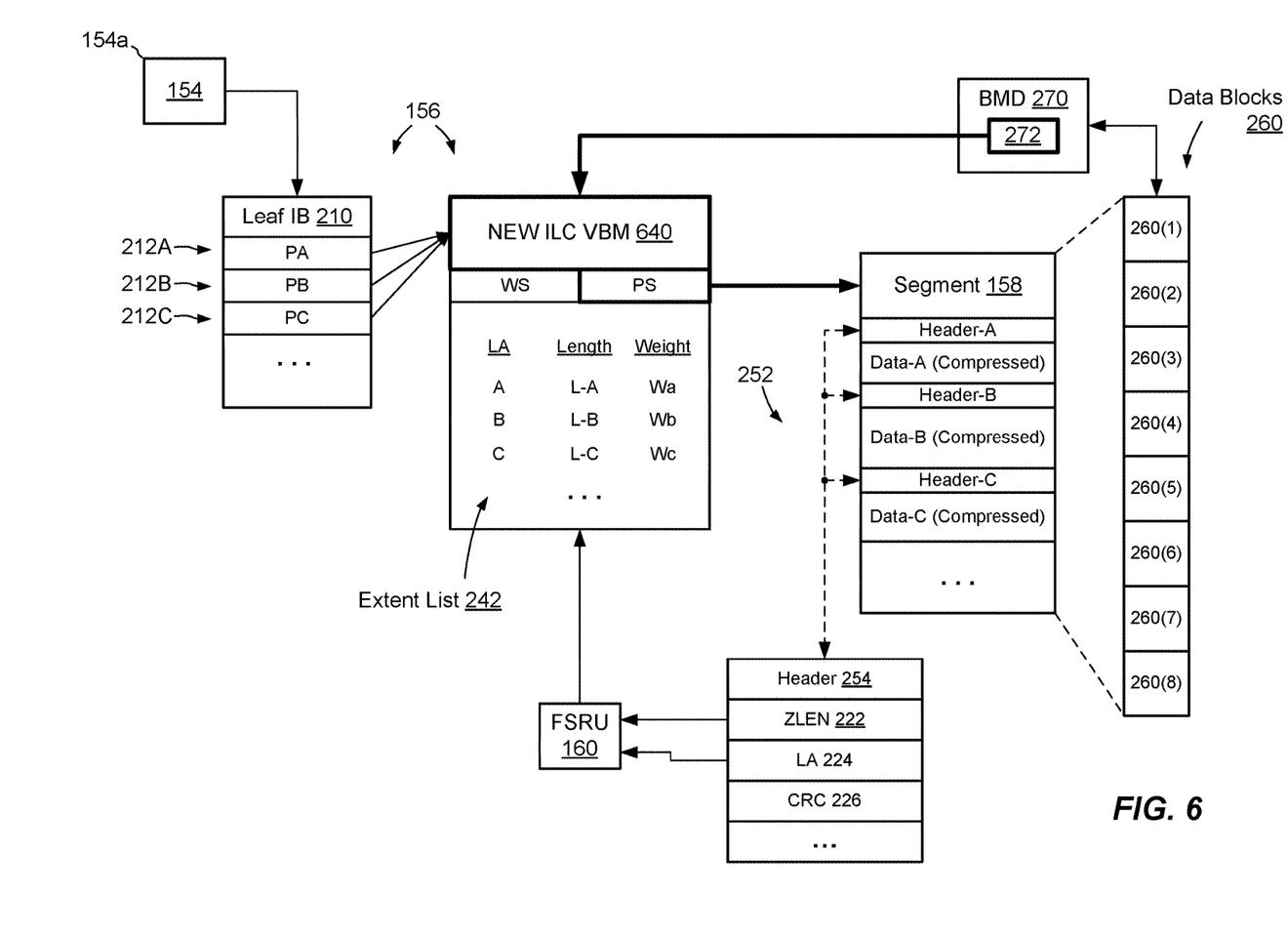
FIG. 6 is a block diagram showing the metadata arrangement of FIG. 5, where a new metadata structure replaces the one with the broken pointer.

FIG. 6 shows an example arrangement by which the FSRU 160 addresses these errors. As an initial matter, FSRU 160 may identify segment 158 by process of elimination, e.g., by traversing all inodes in the file system 150 and marking off each pointed-to block in a bitmap, which may be arranged by FSBN. Of the remaining blocks represented in the bitmap, the FSRU 160 identifies those blocks that are allocated by the file system 150. The FSRU 160 may then restrict its search for lost, or "orphan" segments to contiguous ranges of allocated blocks that are not pointed to by any inode.

The FSRU 160 may identify segment 158 in this fashion, and proceed to read its compression headers 254, e.g., by reading each header and jumping forward ZLEN (222) bytes to the next header. The FSRU 160 also allocates (or otherwise obtains) a new ILC VBM 640. As the FSRU 160 reads each compression header 254 in segment 158, the FSRU 160 populates the extent list 242 of the new ILC VBM 640 with corresponding values, providing ZLEN 222 values for extent lengths and LA 224 values for corresponding logical addresses. FSRU 160 may also write the address of block 260(1) in the pointer PS of the new ILC VBM 640, and may further write the address of the new ILC VBM 640 in the back-pointer 272 of BMD 270. FSRU 160 may still further update pointers 212 in leaf IB 210, such that they point to the new ILC VBM 640. In this fashion, all pointers are repaired in the metadata path 156 between the inode 154 and the extents in segment 158. Access to compressed data in segment 158 is thereby restored and data loss is avoided.

One should appreciate that additional repair operations may be performed. For example, FSRU 160 may update weights (Wa, Wb, Wc, etc.) in the extent list 242, e.g., by checking numbers of pointers 212 or by providing default values for these weights.

Figure 7:
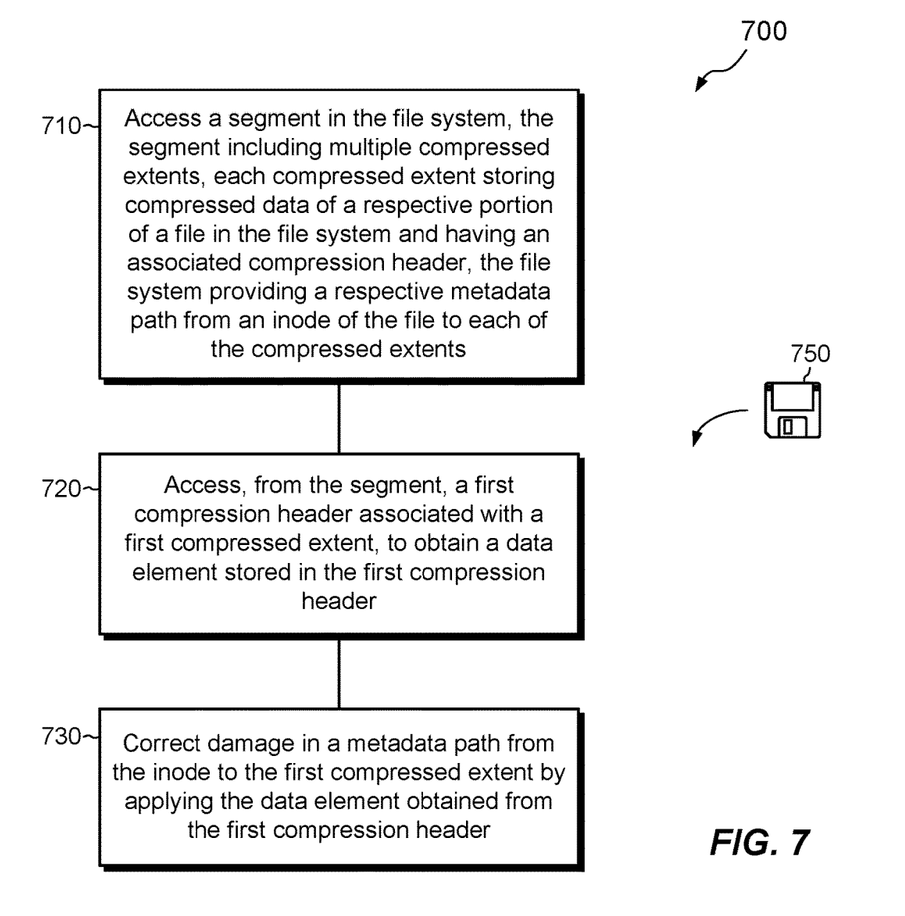
FIG. 7 is a flowchart showing an example method of repairing damage to a file system in accordance with embodiments hereof.

FIG. 7 shows an example method 700 that may be carried out in connection with the environment 100. The method 700 is typically performed, for example, by the software constructs described in connection with FIG. 1, which reside in the memory 130 of the storage processor 120 and are run by the set of processing units 124. The various acts of method 700 may be ordered in any suitable way. Accordingly, embodiments may be constructed in which acts are performed in orders different from that illustrated, which may include performing some acts simultaneously.

At 710, a segment 158 is accessed in the file system 150. The segment 158 includes multiple compressed extents (e.g., DATA-A, DATA-B, DATA-C, and so on). Each compressed extent stores compressed data of a respective portion of a file 154a in the file system 150 and has an associated compression header 254. The file system 150 provides a respective metadata path 156 from an inode 154 of the file 154a to each of the compressed extents.

At 720, the method 700 accesses, from the segment 158, a first compression header 254 associated with a first compressed extent (e.g., any of DATA-A, DATA-B, DATA-C, and so on), to obtain a data element (e.g., ZLEN 222 or LA 224) stored in the first compression header 254.

At 730, the method 700 corrects damage in a metadata path 156 from the inode 154 to the first compressed extent by applying the data element obtained from the first compression header 254. For example, the FSRU 160 may correct damage in an extent length or logical address in extent list 242, or it may provide a new ILC VBM 640 and populate its extent list with values from compression headers 254.

An improved technique has been described for repairing damage to a file system 150. The technique includes storing compression headers 254 in association with respective extents of in-line compressed data (e.g., DATA-A, DATA-B, DATA-C, and so on). A repair utility such as FSRU 160 reads contents from the compression headers 254 and applies the contents to repair damaged metadata structures 156 that the file system uses to access the associated extents. In this fashion, the repair utility restores access to compressed data, which would otherwise be lost.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of repairing damage to a file system, the method comprising:
   accessing a segment in the file system, the segment including multiple compressed extents and extending over a contiguous range of multiple blocks in the file system, each compressed extent storing compressed data of a respective portion of a file in the file system and having an associated compression header, the file system providing a respective metadata path from an inode of the file to each of the compressed extents;
   accessing, from the segment, a first compression header associated with a first compressed extent, to obtain a data element stored in the first compression header, the data element storing a compressed length of the first compressed extent; and
   correcting damage in a metadata path from the inode to the first compressed extent by applying the data element obtained from the first compression header,
   wherein the metadata path from the inode to the first compressed extent includes a mapping structure stored separately from the segment, the mapping structure including an extent list that stores per-extent metadata fields for each of the multiple compressed extents in the segment, the per-extent metadata fields for the first extent including a field that stores a separate version of the compressed length of the first compressed extent, and
   wherein the method further comprises (i) detecting a mismatch between (a) the separate version of the compressed length in the extent list and (b) the compressed length obtained from the first compression header and (ii) replacing the separate version of the compressed length in the extent list with a version based on the compressed length obtained from the first compression header.

2. The method of claim 1, further comprising, after detecting the mismatch:
   identifying a set of compressed extents located in the segment after the first compressed extent; and
   for each of the set of compressed extents, replacing a respective version of the compressed length of that extent in the extent list with a version based on a compressed length obtained from the respective compression header.

3. A data storage system, comprising control circuitry that includes a set of processing units coupled to memory, the control circuitry constructed and arranged to perform a method that comprises:
   accessing a segment in the file system, the segment including multiple compressed extents and extending over a contiguous range of multiple blocks in the file system, each compressed extent having a pre-compressed size of one block, storing compressed data of a respective portion of a file in the file system, and having an associated compression header, the file system providing a respective metadata path from an inode of the file to each of the compressed extents;
   accessing, from the segment, a first compression header associated with a first compressed extent, to obtain a data element stored in the first compression header, the data element including a logical block address at which the compressed data of the first compressed extent is logically located within the file; and
   correcting damage in a metadata path from the inode to the first compressed extent by applying the data element obtained from the first compression header,
   wherein the metadata path from the inode to the first compressed extent includes a mapping structure stored separately from the segment, the mapping structure including an extent list that stores per-extent metadata fields for each of the multiple compressed extents in the segment, the per-extent metadata fields for the first extent including a field that stores a separate version of the logical block address of the compressed data stored in the first compressed extent, and wherein the method further comprises (i) detecting a mismatch between (a) the separate version of the logical block address in the extent list and (b) the logical block address obtained from the first compression header and (ii) replacing the separate version of the logical block address in the extent list with the logical block address obtained from the first compression header.

4. The data storage system of claim 3, wherein the method further comprises, after detecting the mismatch:
  identifying a set of compressed extents located in the segment after the first compressed extent; and
  for each of the set of compressed extents, replacing a respective logical block address in the extent list with a logical block address obtained from the respective compression header.

5. The data storage system of claim 3,
  wherein the method further comprises, in response to detecting that multiple logical block addresses for respective extents in the extent list are identical, replacing the multiple logical block addresses in the extent list with corresponding logical block addresses obtained from respective compression headers in the segment.

6. A computer program product including a set of non-transitory, computer-readable media having instructions which, when executed by control circuitry of a data storage system, cause the control circuitry to perform a method for storing data, the method comprising:
  accessing a segment in the file system, the segment including multiple compressed extents and extending over a contiguous range of multiple blocks in the file system, each compressed extent storing compressed data of a respective portion of a file in the file system and having an associated compression header, the file system providing a respective metadata path from an inode of the file to each of the compressed extents;
  accessing, from the segment, a first compression header associated with a first compressed extent, to obtain a data element stored in the first compression header; and
  correcting damage in a metadata path from the inode to the first compressed extent by applying the data element obtained from the first compression header,
  wherein the damaged metadata path from the inode to the first compressed extent includes a damaged block pointer to the segment in a mapping structure, such that the file system cannot locate the segment using the mapping structure, and wherein the method further comprises:
  providing a new mapping structure to replace the mapping structure having the damaged block pointer;
  populating an extent list of the new mapping structure with data elements obtained from the compression headers associated with the compressed extents in the segment; and
  writing, to a block pointer field in the mapping structure, a pointer value that points to the segment.

7. The computer program product of claim 6, wherein the data elements in each compression header include a length of the compressed extent and a logical block address at which the compressed extent resides in the file, such that populating the extent list includes storing, in a set of per-extent metadata fields for each compressed extent, the length and the logical block address of that compressed extent.

8. The computer program product method of claim 7, wherein the file system includes block pointers to the damaged mapping structure, and wherein the method further comprises updating the block pointers to the damaged mapping structure to point to the new mapping structure.

9. The computer program product of claim 8, wherein the segment has associated metadata that includes a back-pointer to the mapping structure, and wherein the method further comprises updating the back-pointer to point to the new mapping structure.

10. The computer program product of claim 6,
  wherein the data element obtained from the first compression header stores a compressed length of the first compressed extent,
  wherein the metadata path from the inode to the first compressed extent includes a mapping structure stored separately from the segment, the mapping structure including an extent list that stores per-extent metadata fields for each of the multiple compressed extents in the segment, the per-extent metadata fields for the first extent including a field that stores a separate version of the compressed length of the first compressed extent, and
  wherein the method further comprises (i) detecting a mismatch between (a) the separate version of the compressed length in the extent list and (b) the compressed length obtained from the first compression header and (ii) replacing the separate version of the compressed length in the extent list with a version based on the compressed length obtained from the first compression header.

11. The computer program product of claim 6,
  wherein each compressed extent in the segment has a pre-compressed size of one block,
  wherein the data element stored in the first compression header includes a logical block address at which the compressed data of the first compressed extent is logically located within the file,
  wherein the metadata path from the inode to the first compressed extent includes a mapping structure stored separately from the segment, the mapping structure including an extent list that stores per-extent metadata fields for each of the multiple compressed extents in the segment, the per-extent metadata fields for the first extent including a field that stores a separate version of the logical block address of the compressed data stored in the first compressed extent, and
  wherein the method further comprises (i) detecting a mismatch between (a) the separate version of the logical block address in the extent list and (b) the logical block address obtained from the first compression header and (ii) replacing the separate version of the logical block address in the extent list with the logical block address obtained from the first compression header.

12. The computer program product of claim 11, wherein the method further comprises, after detecting the mismatch:
  identifying a set of compressed extents located in the segment after the first compressed extent; and
  for each of the set of compressed extents, replacing a respective logical block address in the extent list with a logical block address obtained from the respective compression header.

13. The computer program product of claim 6,
  wherein each compressed extent in the segment has a pre-compressed size of one block,
  wherein the data element stored in the first compression header includes a logical block address at which the compressed data of the first compressed extent is logically located in the file, wherein the metadata path from the inode to the first compressed extent includes a mapping structure stored separately from the segment, the mapping structure including an extent list that stores per-extent metadata fields for each of the multiple compressed extents in the segment, the per-extent metadata fields for the first extent including a field that stores a separate version of the logical block address of the compressed data stored in the first compressed extent, and wherein the method further comprises, in response to detecting that multiple logical block addresses for respective extents in the extent list are identical, replacing the multiple logical block addresses in the extent list with corresponding logical block addresses obtained from respective compression headers in the segment.

* * * * *